UNITED STATES PATENT OFFICE.

GEORG KALISCHER, OF FRANKFORT-ON-THE-MAIN, GERMANY, ASSIGNOR TO CASSELLA COLOR COMPANY, OF NEW YORK, N. Y.

BROWN AZO DYE AND PROCESS OF MAKING SAME.

No. 879,552.  Specification of Letters Patent.  Patented Feb. 18, 1908.

Application filed September 4, 1907. Serial No. 391,386.

*To all whom it may concern:*

Be it known that I, GEORG KALISCHER, a citizen of the German Empire, resident of Frankfort-on-the-Main, Prussia, have invented new and useful Improvements in Brown Azo Dye and Processes of Making Same, of which the following is a specification.

I have found that valuable monoazodyestuffs are obtained by combining the diaminodiphenyl- and diaminophenylnaphthyl- ethersulfonic acids of the formulæ

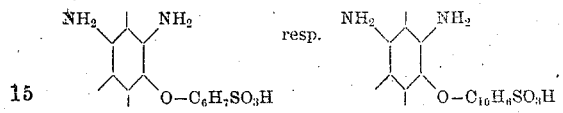

with the diazo compounds of o-aminophenol derivatives.

The production of diaminophenylnaphthylether sulfonic acids has already been described in the French Patent No. 287,850; the diaminodiphenylether sulfonic acids are obtained in an analogous manner by condensing dinitrochlorbenzene with the phenolsulfonic acids in an aqueous solution in the presence of soda or caustic soda lye and reducing the nitro products so obtained.

The new coloring matters are represented by the following general formula

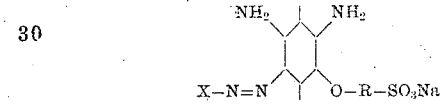

(wherein X signifies the radical of an orthodiazophenol and R an aromatical radical as phenyl or naphthyl).

They are dark powders dissolving in water with orange to brownish-red color, in concentrated sulfuric acid with orange to bluish-red color, and dye unmordanted wool in brownish-orange to brownish-red shades, which treated with bichromate are converted into full yellowish-brown shades, distinguished by their excellent fastness to washing and milling and, in particular, by their unusual fastness to light.

The process is illustrated by the following examples:

Example 1. The diazo solution produced in the well-known manner from 15.4 kilos p-nitro-o-aminophenol, 36 kilos hydrochloric acid and 6.9 kilos nitrite is allowed to run into a solution of 35 kilos diaminophenyl-beta-naphthylether-6-sulfonic acid (from 2.6 naphtholsulfonic acid and dinitrochlorbenzene) in presence of an excess of soda. The whole is stirred for several hours in the cold, and after heating to 60° C., the coloring matter which has formed is precipitated by common salt as a brown powder soluble in water with an orange color and yields when dyed direct on wool a brownish-orange shade, which by chroming is changed into a full yellowish-brown.

Example 2. If in the foregoing example instead of the diaminophenyl-beta-naphthylether-6-sulfonic acid 28 kilos diaminodiphenylether-p-sulfonic acid (from p-phenolsulfonic acid and dinitrochlorbenzene) are used, a dyestuff of analogous properties is obtained which dyes wool direct orange and the shade of which when after-chromed is quite yellowish-brown. In an analogous manner valuable dyestuffs with quite similar properties are obtained if in the above examples the p-nitro-o-aminophenol is replaced by the equivalent quantity of another o-aminophenol derivate, as o-aminophenol sulfonic acid, nitroaminophenolsulfonic acid or picraminic acid, and if other diaminodiphenyl- or diaminophenylnaphthylether sulfonic acids are used.

What I claim is—

1. The process for the manufacture of monoazo dyes which consists in combining one molecule of the diazo compound of an orthoaminophenol derivative with one molecule of a diaminodiphenyl- or diaminophenylnaphthylether sulfonic acid of the formula

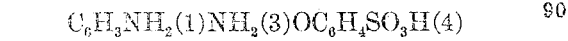

substantially as described.

2. As new products the monoazo dyestuffs, thus obtained, corresponding to the

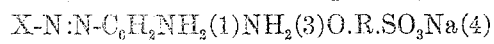

(wherein X signifies the radical of an orthodiazophenol and R an aromatical radical as phenyl or naphthyl), being dark powders, soluble in water with orange to brownish-red color, soluble in concentrated sulfuric acid with orange to red color, dyeing unmordanted wool in brownish-orange to brownish-red shades changing into brown shades by after-chroming, substantially as described.

In witness whereof I have hereunto signed my name this 17th day of August 1907, in the presence of two subscribing witnesses.

GEORG KALISCHER.

Witnesses:
JEAN GRUND,
CARL GRUND.